US011329922B2

(12) United States Patent
Burnette et al.

(10) Patent No.: US 11,329,922 B2
(45) Date of Patent: May 10, 2022

(54) SYSTEM AND METHOD FOR REAL-TIME MOBILE NETWORKS MONITORING (71) Applicant: Opanga Networks, Inc., Seattle, WA (US)

(72) Inventors: John Burnette, Seattle, WA (US); Ben Hadorn, Seattle, WA (US); Jose Gonzalez, Seattle, WA (US); Dave Gibbons, Seattle, WA (US)

(73) Assignee: Opanga Networks, Inc., Bellevue, WA (US)

( * ) Notice: Subject to any disclaimer, the term of this patent is extended or adjusted under 35 U.S.C. 154(b) by 0 days.

(21) Appl. No.: 17/138,559

(22) Filed: Dec. 30, 2020

(65) Prior Publication Data
US 2021/0203710 A1     Jul. 1, 2021

Related U.S. Application Data (60) Provisional application No. 62/956,138, filed on Dec. 31, 2019, provisional application No. 62/956,104, (Continued)

(51) Int. Cl.
| H04L 12/26 | (2006.01) |
| H04W 28/02 | (2009.01) |
| H04L 47/11 | (2022.01) |
| H04L 41/12 | (2022.01) |
| H04L 47/27 | (2022.01) |
| H04L 47/127 | (2022.01) |

(Continued)

(52) U.S. Cl.
CPC ............ *H04L 47/14* (2013.01); *H04L 41/12* (2013.01); *H04L 43/08* (2013.01); *H04L 43/0876* (2013.01); *H04L 43/16* (2013.01); *H04L 47/11* (2013.01); *H04L 47/127* (2013.01); *H04L 47/27* (2013.01); *H04L 63/1425* (2013.01); *H04L 65/80* (2013.01); *H04L 67/22* (2013.01); *H04N 21/2402* (2013.01)

(58) Field of Classification Search
CPC ..... H04L 65/80; H04L 41/12; H04L 63/1425; H04L 43/16; H04L 43/08; H04N 21/2402
See application file for complete search history.

(56) References Cited

U.S. PATENT DOCUMENTS 9,516,541 B2 * 12/2016 Gai .................. H04W 28/0247
10,567,988 B2 * 2/2020 Harrang ............. H04L 43/0864
(Continued)

FOREIGN PATENT DOCUMENTS

CN         110728823 A   *   1/2020

*Primary Examiner* — Oanh Duong (57) ABSTRACT

Real-time cell performance information for each of cells in a mobile communication network, referred to herein as network topology information, is produced using IP addresses of data sessions in the cells, measured performance of the data sessions, and IP address to cell identifier mappings. The network topology information may be used to determine, in real time, a level of monitoring for each of the cells. The network topology information may be used to determine, in real time, performance of video streams in each cell. The network topology information may be used to determine, in real time, that a cell is experiencing a performance anomaly. Determinations made using the network topology information may be used to configure, maintain, and optimize the performance of the mobile communication network.

18 Claims, 5 Drawing Sheets

Related U.S. Application Data filed on Dec. 31, 2019, provisional application No. 62/956,135, filed on Dec. 31, 2019.

(51) Int. Cl.
*H04L 43/0876* (2022.01)
*H04L 67/50* (2022.01)
*H04L 43/08* (2022.01)
*H04L 43/16* (2022.01)
*H04L 29/06* (2006.01)
*H04L 65/80* (2022.01)
*H04N 21/24* (2011.01)

(56) References Cited

U.S. PATENT DOCUMENTS

| | | | | |
|---|---|---|---|---|
| RE48,328 E | * | 11/2020 | Elefant | H04W 28/0284 |
| 10,887,778 B2 | * | 1/2021 | Anand | H04M 15/41 |
| 2009/0227251 A1 | * | 9/2009 | Lei | H04L 41/5054 |
| | | | | 455/425 |
| 2010/0169045 A1 | * | 7/2010 | Shin | G01R 31/31726 |
| | | | | 702/179 |
| 2012/0123867 A1 | * | 5/2012 | Hannan | G06Q 30/0261 |
| | | | | 705/14.58 |
| 2013/0101221 A1 | * | 4/2013 | Fujiki | B61L 23/044 |
| | | | | 382/195 |
| 2015/0141024 A1 | * | 5/2015 | Kapnadak | H04W 16/10 |
| | | | | 455/446 |
| 2015/0148040 A1 | * | 5/2015 | Ehrlich | H04W 24/02 |
| | | | | 455/436 |
| 2016/0014635 A1 | * | 1/2016 | Rasanen | H04L 47/12 |
| | | | | 370/230 |
| 2016/0065419 A1 | * | 3/2016 | Szilagyi | G06F 11/3006 |
| | | | | 709/224 |
| 2016/0212633 A1 | * | 7/2016 | Flanagan | H04W 16/18 |
| 2018/0295553 A1 | * | 10/2018 | Abdelmonem | H04W 24/06 |
| 2019/0334784 A1 | * | 10/2019 | Kvernvik | H04W 24/08 |
| 2019/0372897 A1 | * | 12/2019 | Fuerter | H04L 47/41 |
| 2020/0059800 A1 | * | 2/2020 | Menon | H04L 43/0811 |
| 2020/0112907 A1 | * | 4/2020 | Dao | H04M 15/66 |
| 2020/0117340 A1 | * | 4/2020 | Amitay | H04L 67/12 |

* cited by examiner

SYSTEM AND METHOD FOR REAL-TIME MOBILE NETWORKS MONITORING

CROSS REFERENCE TO RELATED APPLICATIONS

This application claims the benefit of U.S. Provisional Patent Application No. 62/956,104, filed on Dec. 31, 2019, U.S. Provisional Patent Application No. 62/956,135, filed on Dec. 31, 2019, and U.S. Provisional Patent Application No. 62/956,138, filed on Dec. 31, 2019, each of which is incorporated by reference herein in their entirety for all purposes.

BACKGROUND

Mobile networks are comprised of a variety of components that, while operating on standard open communication interfaces, maintain proprietary (per vendor) databases of information and effectively form a closed system. External components, such as network optimizers, are unable to get a full view of real-time network conditions (e.g., throughput, user counts, etc.) and must rely on the limited information that is provided by those components. What limited information is provided is only done across long intervals (e.g., one-hour averages). Due to the highly volatile nature of mobile networks, one-hour averages are not adequate for optimizers to take meaningful action.

Mobile network analytics systems of the related art are not "radio aware" and thus do not provide Radio Access Network (RAN) operators with the key performance indicators required for better network planning/management. As a result, RAN operators may be wholly reliant on the long-average Key Performance Indicators (KPIs) reported by the radio vendor systems.

A need exists to leverage discovered relations between data sessions and network locations to improve the monitoring and management of RANs.

BRIEF SUMMARY OF THE DISCLOSURE

An objective of the disclosed embodiments is to use real-time tracking information to improve the monitoring and management of mobile telecommunication networks, where the real-time tracking information is generated by taking measurements of data sessions, determining network location identifiers (such as a cell identifier in a RAN) in which endpoints of the data sessions respectively reside, and associating the measurements of the data sessions with the respective network location identifiers.

In an embodiment, a method for monitoring a network comprises producing User Equipment (UE) location information by tracking UEs on each of a plurality of cells of the network, and producing, using the UE location information, real-time network metrics, the real-time network metrics including respective real-time performance information for the plurality of cells.

In embodiments of the method, the real-time network metrics is network topology information.

In embodiments, the method comprises identifying, in real-time using the real-time network metrics, a cell of the plurality of cells having anomalous performance.

In embodiments, the method comprises determining, using the real-time network metrics, whether a cell in the plurality of cells is experiencing a performance anomaly, in response to determining that the cell is experiencing the performance anomaly, reporting performance information about the cell at an enhanced interval, and in response to determining that the cell is not experiencing the performance anomaly, reporting performance information about the cell at a normal interval, the normal interval being longer than the enhanced interval.

In embodiments of the method, determining whether the cell in the plurality of cells is experiencing the performance anomaly comprises determining whether a measurement for the cell in the real-time network metrics is outside of a range.

In embodiments, the method comprises periodically, according to an anomaly detection interval, determining whether the cell in the plurality of cells is experiencing the performance anomaly.

In embodiments, the method comprises determining, using the real-time network metrics, that a data stream in a cell of the plurality of cells is carrying video data, determining, using the real-time network metrics, second by second (S×S) rate data for the data stream, determining, in real-time using the S×S rate data, video statistics, the video statistics including a bitrate estimate for the video data, a video resolution of the video data, an average video throughput, a buffer fill level corresponding to the video data, an average start time corresponding to the video data, stall information corresponding to the video data, or combinations thereof, and reporting the video statistics in real-time.

In embodiments, the method comprises determining that the data stream is carrying video data according to an address of the data stream and information about addresses of sources of video data.

In embodiments, the method comprises determining, using machine learning, that the data stream is carrying video data when a pattern in the real-time network metrics corresponding to the data stream corresponds to a pattern for video-carrying data streams.

In embodiments of the method, the real-time performance information for the plurality of cells includes average user throughput, average active users, average connected users, video performance metrics, traffic composition, cell congestion level, or combinations thereof.

Embodiments may also include a non-transitory computer readable medium having computer-executable instructions embodied thereon that when executed by at least one processor cause the processor to perform one or more of the methods described above.

Embodiments may also include a system including at least one processor and configured to perform one or more of the methods described above.

DESCRIPTION

Embodiments relate to a system that allows operators to monitor the real-time view of a network or cell condition.

Embodiments include a system that combines, using IP addresses of data sessions, measured data session performance and IP address to network location (e.g., ECI) information to create a "crowd" of location-specific (e.g., cell or sector specific) information for a given network topology. The combined measured data session performance and IP address to network location (e.g., ECI) information may be referred to as network topology information, and may include per-cell measurements and/or statistics of data session performance. That information is then used for network monitoring purposes as well as for deep dive analysis of problem cells or problem flows in the network at a level and with performance metrics unavailable in the related arts.

As used herein, a 'channel' may refer to a wireless communication channel, such as a cell of a wireless network. A cell may correspond to a carrier (that, an operating bandwidth, such as a bandwidth associated with a 600 MHz, 700 MHz, 850 MHz, 1700/2100 MHz, 1900 MHz, 2300 MHz, or other carrier frequency) of a sector of an eNodeB; for example, an eNodeB having three sectors and supporting 850 and 39,000 MHZ carriers in each sector would have six cells, each with a unique identifier. The unique identifier of the cell may be an Evolved Universal Mobile Telecommunication System (UMTS) Terrestrial Radio Access (E-UTRAN) Cell Identifier (ECI) or E-UTRAN Global Cell Identifier (EGCI).

As used herein, "real-time processing" and the like refers to substantially immediate processing, for example, processing where the result is produced no later than a small delay after the most recent data needed to produce the result is received, and "real-time data" and the like refers to substantially current data, for example, data that reflects conditions that existed no more than the small delay before the real-time data was created. The small delay may be, for example, 15 seconds, 5 seconds, 2 seconds, or 1 second, according to implementation, but embodiments are not limited thereto.

US patent application Ser. No. 16/363,749, titled COORDINATED DATA SHARING IN VIRTUALIZED NETWORKING ENVIRONMENTS, filed Mar. 25, 2019, and published as US Pub. No. 2019/0296991 A1, provides techniques for discovering the relations between an endpoint of a data session (as indicated by an Internet Protocol (IP) address) and a location (e.g., a cell, as identified by an ECI or EGCI) of that endpoint within the network. As disclosed therein, messages on a control interface (such as an S1-MME interface of a 4G LTE wireless network) may be monitored to determine a mapping between IP addresses used in data sessions and an identifier (e.g., an ECI) indicating a portion of the wireless network, such as a cell. The mappings are stored in a mapping database, and updated as UEs move within the network and as data sessions are initiated and terminated. Data sessions may then be analyzed to determine data session analytics. The data session analytics may include data session throughput, size, latency, and IP addresses of the data session. The information in the mapping database may be used to add identifiers of a part of the wireless network (for example, ECIs identifying respective cells) to the data session analytics. The ECI-tagged data session analytics may then be used as samples in embodiments of the present disclosure.

In an embodiment, IP address to ECI mapping information is provided to a network data plane agent. The data plane agent collects detailed statistics on data sessions (e.g., throughput, data size, transmit times and durations, etc.). The data plane agent uses the IP:ECI mapping information to insert ECI into the statistics/metrics that it collects. Statistics can now be aggregated based on network topology (e.g., per ECI) and analyzed to extract patterns and trends from the crowd (e.g., from the plurality of monitored data sessions). This crowd-sourced data is fed back into algorithms which apply the crowd information to improve optimization. It is also fed back to network monitoring system, which allows that system to detect changing network conditions that may justify more detailed monitoring of portions of the network.

Embodiments relate to a system that leverages data session IP address to network location identifier (e.g., ECI) correspondence information, along with measured data session performance, to create a "crowd" of information for a given network topology. That information is then used for optimization and network monitoring purposes.

In an embodiment, a system provides top level statistics for individual cells on a short interval (e.g., 15 minutes, which matches best case radio vendor KPI report intervals of the related art). The system may automatically detect problem cells in a network, and may provide more granular (e.g., per second) statistics for the problem cells.

Figure 1:
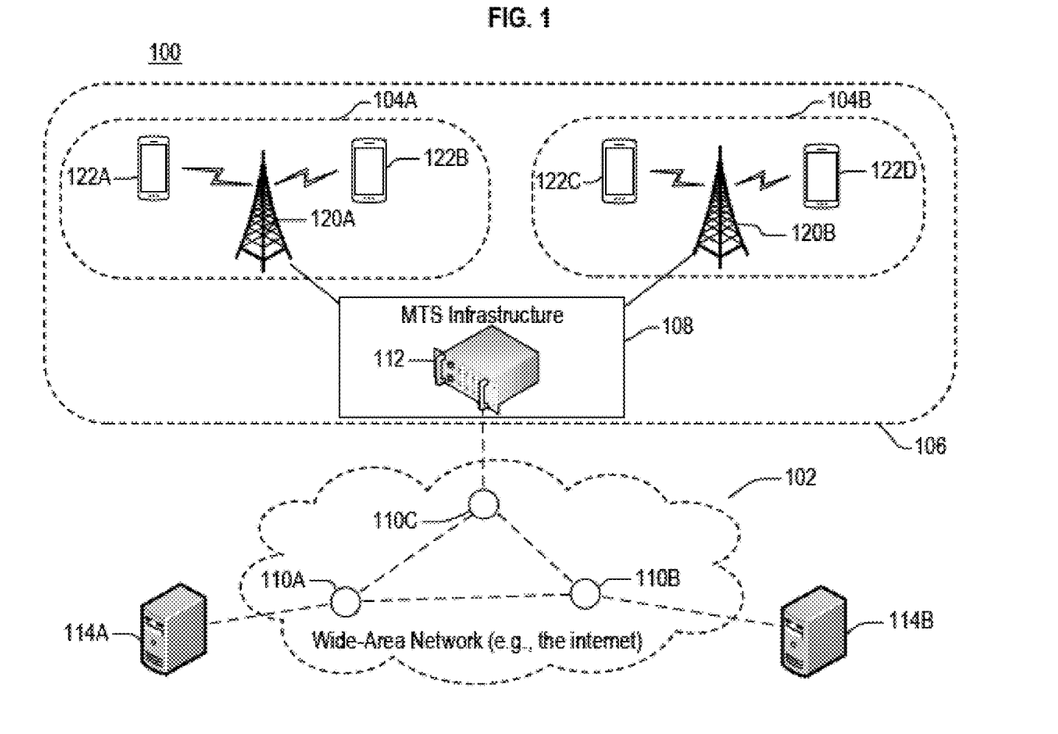
FIG. 1 illustrates a communication network according to an embodiment.

FIG. 1 illustrates a communication network 100 according to an embodiment. The network 100 includes a Wide-Area Network (WAN) 102 (for example, the Internet), a mobile telecommunication system (MTS) 106, and first and second servers 114A and 114B attached to the WAN 102. The MTS 106 includes an MTS infrastructure 108 that connects first and second Radio Access Networks (RANs) 104A and 104B to each other and to the WAN 102. The MTS infrastructure 108 may include a gateway 112 through which communications between the WAN 102 and the MTS 106 are performed.

The WAN 102 includes a plurality of routers 110A, 110B and 110C, all in direct or indirect communication with each other. The routers 110A, 110B, and 110C operate at a networking layer of a protocol stack to route packets; for example, at the Internet Protocol (IP) layer of a Transmission Control Protocol/Internet Protocol (TCP/IP) protocol stack. The routers 110A, 110B, and 110C perform their functions using information provided in the IP headers of an IP datagram.

The gateway 112 connects to the third router 110C and operates at a transport layer or higher of a protocol stack. For example, the gateway 112 may operate using information in User Datagram Protocol (UDP) headers, TCP headers, and/or other transport layer protocol headers, the transport layer protocol headers being encapsulated in the IP data of IP datagrams.

In an embodiment, the gateway 112 may be implemented using a gateway Virtual Network Function (VNF) running on commodity server hardware. In such an embodiment, additional VNFs may be provided on the gateway 112.

For example, the gateway 112 may also function as an aggregation point for the RANs 104A and 104B. Furthermore, the gateway 112 may provide transport management and monitoring and control functions for the RANs 104A and 104B, and providing transport optimization for the MTS 106, including, for example, real-time optimization of fair-share transport protocols in response to congestion in the MTS 106. The gateway 112 may communicate with the RANs 104A and 104B through a backhaul network.

The first RAN 104A includes a base station 120A and a plurality of User Equipment (UEs) 122A and 122B wirelessly communicating with the first base station 120A over one or more shared radio-frequency (RF) resources of the first RAN 104A. The second RAN 104B includes a base station 120B and a plurality of UEs 122C and 122D wirelessly communicating with the second base station 120B over one or more shared RF resources of the second RAN 104B. The UEs 122A to 122D communicate with the WAN 102 via the base stations 120A and 120B and the gateway 112. The base stations 120A and 120B may be Evolved Node Bs (eNodeBs), Base Transceiver Stations (BTSs), or the like, and the UEs 122A to 122D may be cellular phones, wireless hotspots, computers with cellular modems, or the like, but embodiments are not limited thereto.

The MTS infrastructure 108 may include communications links (for example, a coaxial cable, fiber optic cable, or the like, or combinations thereof) connecting the first base stations 120A, the second base station 120B, and the gateway 112. The MTS infrastructure 108 may include resources for implementing embodiments of the present disclosures; in embodiments, those resources may include the gateway 112.

First and second servers 114A and 114B may provide services to devices connected to the WAN 102. Examples of services that may be provided include cloud computing, cloud storage, social networking, streaming video, and the like.

Figure 2:
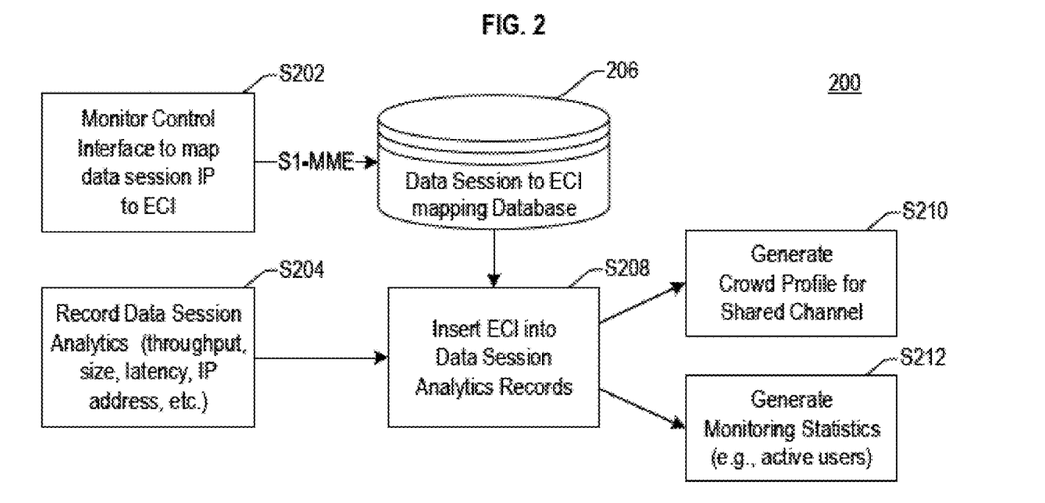
FIG. 2 illustrates a data flow for crowd-sourced data, according to an embodiment.

FIG. 2 illustrates a data flow 200 according to an embodiment, and describes how a monitoring system according to a present embodiment receives analytics information. Details of embodiments of steps S202, S204, and S208 and database 206 are described in U.S. patent application Ser. No. 16/363,749, published as US Pub. No. 2019/0296991 A1, and accordingly a brief overview of each step is presented in this application in the interest of brevity.

Figure 3:
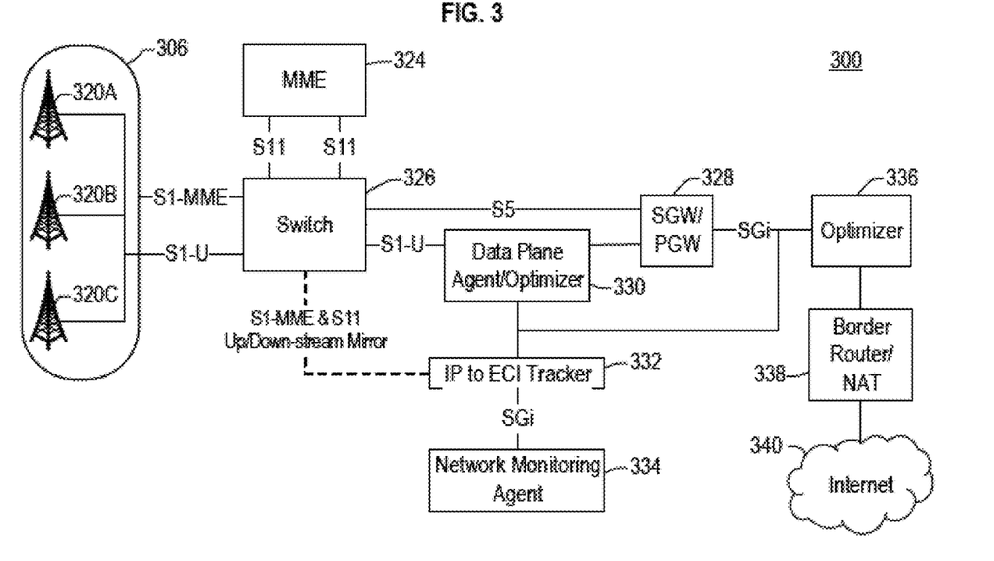
FIG. 3 illustrates a 4th Generation (4G) Long Term Evolution (LTE) wireless network, according to an embodiment.
Figure 4:
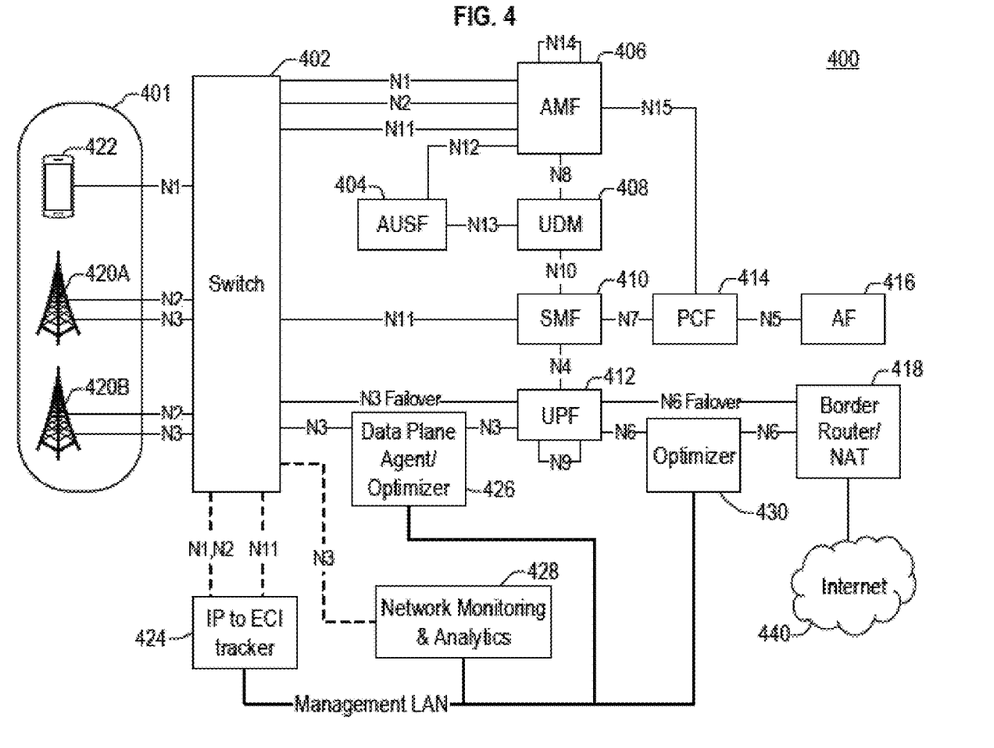
FIG. 4 illustrates a 5th Generation (5G) wireless network, according to an embodiment.

At S202, messages on a control interface (such as an S1-MME interface of a 4G LTE wireless network such as shown in FIG. 3 or an N2 and/or N11 interface of a 5G wireless network such as shown in FIG. 4) are monitored in order to determine a mapping between IP addresses used in data sessions and an identifier indicating a portion of the wireless network (such as an ECI indicating a cell). The mappings are stored in a mapping database such as the data session to ECI mapping database 206, and updated as a UE moves within the network and as data sessions are initiated and terminated.

At S204, data sessions are analyzed to determine data session analytics. The data session analytics may include data session throughput, size, latency, and IP addresses of the data session. The data session analysis may be performed by analyzing messages from, for example, and S1-U interface of a 4G LTE wireless network or an N3 interface of a 5G wireless network.

At S208, the information in the data session to ECI mapping database 206 is used to add identifiers of a portion of the wireless network (for example, ECIs that identify a cell) to the data session analytics produced in S204. The ECI-tagged data session analytics may be used in S210 and S212.

At S210, the ECI-tagged data session analytics may be used to create a crowd-sourced profile for a shared channel (such as a cell). The crowd sourced profile may include an average UE throughput within the cell, a number of active UEs in the cell, a total data volume in the cell, a number of UEs connected but not actively transmitting, and the like.

At S212, respective monitoring statistics are generated for parts (such as cells) of the wireless network. Examples of monitoring statistics include a number of connected UEs in a cell, a number of active UEs in the cell (that is, UEs currently sending and/or receiving data, as distinct from connected but idle UEs), data volume in the cell, latency statistics for sessions using the cell, and the like, but embodiments are not limited thereto.

A data plane agent/optimizer (such as identified by reference character 330 in FIG. 3 and by reference character 426 in FIG. 4) may use the monitoring statistics to optimize the performance of the wireless network. For example, the data plane agent/optimizer may adapt a congestion management protocol according to a profile generated at S210, monitoring statistics generated at S212, or both.

FIGS. 3 and 4 show how embodiments may be implemented in both 4G and 5G networks.

FIG. 3 illustrates a 4$^{th}$ Generation (4G) Long Term Evolution (LTE) wireless network 300 (hereinafter, the 4G network 300) according to an embodiment.

The 4G network 300 includes at least one RAN 306 including one or more extended Node Bs (eNodeBs), here shown as first, second, and third eNodeBs 320A, 320B, and 320C. The RAN 306 communicates control information with a switch 326 using an S1-MME interface using a S1-AP protocol, while the eNodeBs 320A, 320B, and 320C communicate user plane data with the switch 326 using an S1-U interface using a GTP-U protocol.

The switch 326 exchanges control information with a Mobility Management Engine (MME) 324 over one or more control plane interfaces S11 using the GPRS Tunneling Protocol for control plane (GTP-C). The switch 326 also communicates with a data plane agent/optimizer 330 using an S1-U interface and with a Serving Gateway/Packet Gateway (SGW/PGW) 328 using an S5 interface. The S5 interface provides user plane tunneling and tunnel management functions and enables serving gateway to connect to multiple packet data network (PDN) gateways for providing different IP services to a UE operating in the RAN 306, and uses GTP-U to exchange user data.

The switch 326 also provides an IP to ECI tracker 332 with mirrored information from the S1-MME interface between the RAN 306 and the switch 326 and from the S11 interfaces between the MME 324 and the switch 326.

The SGW/PGW 328, the data plane agent/optimizer 330, the IP to ECI tracker 332, and an optimizer 336 exchange information through SGi interfaces using an Internet Protocol (IP). The IP to ECI tracker 332 may also communicate with a network monitoring agent 334 using an SGi interface.

The optimizer 336 sends and receives packets to the internet 340 through a border router/Network Address Translation (NAT) engine 338.

The IP to ECI tracker 332 monitors upstream and downstream information from the switch 326 to determine and maintain relationships between IP addresses and ECIs.

The Network Monitoring Agent 330 may perform step S210, step S212, or both of process 200 of FIG. 2, and may provide the results from one or both of those steps to the data plane agent/optimizer 330, the optimizer 336, or both.

Each of the MME 324, the switch 326, the SGW/PGW 328, the data plane agent/optimizer 330, the IP to ECI tracker 332, the network monitoring agent 334, the optimizer 336, and the border router/NAT device 338 may be parts of an MTS infrastructure such as MTS infrastructure 108 of FIG. 1, and may be implemented using specialized hardware, software running on a respective or shared computing device having the appropriate interfaces, or combinations thereof.

FIG. 4 illustrates a 5$^{th}$ Generation (5G) wireless network 400 (hereinafter, the 5G network 400) according to an embodiment.

The 5G network 400 includes an Authentication Server Function (AUSF) 404, an Access and Mobility Management Function (AMF) 406, Unified Data Management (UDM) 408, a Session Management Function (SMF) 410, a User Plane Function (UPF) 412, a Policy Control Function (PCF) 414, and an Application Function (AF) 416. The 5G network 400 may also include a border router/NAT device 418, an IP to ECI tracker 424, a data plane agent/optimizer 426, a Network Monitoring & Analytics function 428, and an optimizer 430. The border router/NAT device 418 couples the 5G network 400 to a Wide Area Lan (WAN) such as the internet 440.

A RAN 401 comprises a UE 422, a first eNodeB 420A, and a second eNodeB 420B. The UE 422 communicates with the AMF 406 using a Non-Access Stratum (NAS) interface N1 interface routed through a switch 402. Each of the first and second eNodeB 420A and 420B communicates with the AMF 406 using a RAN control plane (CP) interface N2 routed through the switch 402 and with the UPF 412 using an N3 interface routed through the switch 402.

The AMF 406 may provide termination of the RAN CP interface N2, termination of the NAS interface N1, NAS ciphering and integrity protection, registration management, connection management, reachability management, mobility management, transport and proxy services for SM messages between the UE 422 and the SMF 410, Access Authorization, Security Anchor Functionality (SEAF), location services management, UE mobility event notification, and other functions.

The UPF 412 provides an anchor point for Intra-/Inter-RAT mobility, an External PDU Session point of interconnect to data network, packet routing & forwarding, packet inspection, a UP part of policy rule enforcement, traffic usage reporting, Quality of Service (QoS) handling for user plane, reflective QoS marking in DL, uplink traffic verification, transport level packet marking in the uplink and downlink, downlink packet buffering and downlink data notification triggering, and other functions. The UPF 412 communicates with the eNodeBs 420A and 420B over an N3 interface. The N3 interface may use the GPRS Tunneling Protocol (GTP) with header extensions for 5G, use segment routing (IPv6 SRv6 or Network Server Heading (NSH)), or use an Information Centric Networking (ICN) protocol. The UPF 412 may communicate with another UPF via an N9 interface.

The SMF 410 provides session management, UE IP address allocation and management; selection and control of UP function, traffic steering configuration at the UPF to route traffic to proper destination, control part of policy enforcement and QoS, and downlink data notification. The SMF 410 may communicate with the UDM 410 using an N10 interface, communicate with the AMF 406 through the switch 402 using an N11 interface, communicate with the PCF 414 using an N7 interface, and communicate with the UPF 412 using an N4 interface.

The PCF 414 supports a unified policy framework to govern network behavior, provides policy rules to Control Plane function(s) to enforce them. and accesses subscription information relevant for policy decisions stored in a Unified Data Repository (UDR).

The UDM 408 provides generation of 3GPP Authenticate Key Exchange (AKA) authentication credentials, user identification handling, access authorization based on subscription data (e.g. roaming restrictions), UE's serving NF Registration management, support to service/session continuity, MT-SMS delivery support, subscription management, and SMS management.

The AUSF 404 provides Authentication Server Function (AUSF) as specified by the 3GPP Service and Systems Aspects (SA) Working Group 3 (WG3) on security and privacy.

The AF 416 provides application influence on traffic routing, accessing network exposure function, and interacts with the policy framework for policy control.

The Network Monitoring & Analytics function 428 may perform step S210, step S212, or both of process 200 of FIG. 2, and may provide the results from one or both of those steps to the data plane agent/optimizer 426, the optimizer 430, or both.

Each of the AUSF 404, the AMF 406, the UDM 408, the SMF 410, the UPF 412, the PCF 414, the AF 416, the border router/NAT device 418, the IP to ECI tracker 424, the data plane agent/optimizer 426, the Network Monitoring & Analytics function 428, and the optimizer 430 may be parts of an MTS infrastructure such as MTS infrastructure 108 of FIG. 1, and may be implemented using specialized hardware, software running on a respective or shared computing device having the appropriate interfaces, or combinations thereof.

In an embodiment, the switch 402 provides the IP to ECI tracker 424 with mirrored information from the N1 interface between the UE 422 and the AMF 406, from the N2 interface between the eNodeBs 420A and 420B and the AMF 406, and from the N11 interface between the AMF 406 and the SMF 410. The switch 402 also provides mirrored data to Network Monitoring & Analytics function 428, the mirrored data being from the N3 interface between the eNodeBs 420A and 420B and data plane optimizer/agent 426 and/or the UPF 412.

In the interest of brevity and clarity, descriptions of some interfaces and interactions within the 5G network 400 that are not needed to disclose embodiments of the present disclosure and/or are well known in the art are not described.

Figure 5:
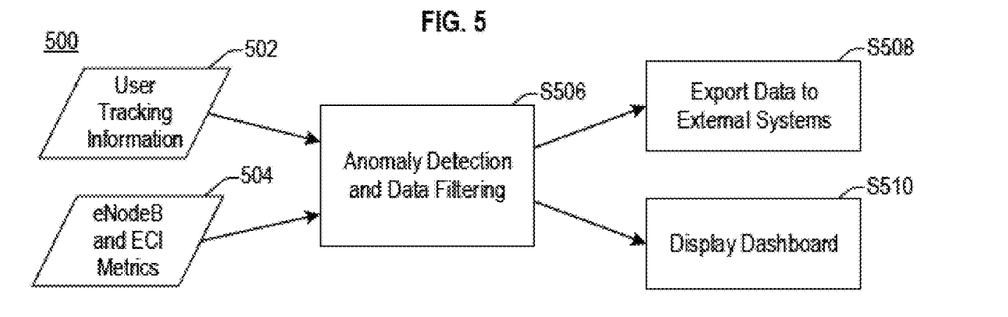
FIG. 5 illustrates a data flow of a monitoring system, according to an embodiment.

FIG. 5 illustrates a data flow of a monitoring system 500, according to an embodiment. The monitoring system 500 may be installed in the core of a mobile operator's network (such as the MTS infrastructure 108 of FIG. 1) which may collect and report real-time network metrics at a granularity and scale unavailable in the related arts. For example, the monitoring system 500 may be implement in or using the Network Monitoring Agent 334 of the 4G network 300 of FIG. 3, or the Network Monitoring & Analytics function 428 of the 5G network 400 of FIG. 4.

At S506, the monitoring system 500 may receive user tracking information 502 than includes the current location of a user (that is, of a UE) on a cell basis. The user tracking information may be derived from control plane information of a network, such as information on the S1-MME and/or S11 interfaces of the 4G network 300 of FIG. 3 or information from N1, N2, and/or N11 interfaces of the 5G network 400 of FIG. 4.

In an embodiment including a 3G network, the monitoring system 500 monitors a mirror of standard S1-MME and S11 control interfaces. The monitoring system 500 matches device tunnel information to user IP addresses to obtain user location at the cell level; here, user location is considered synonymous with UE location. As users move about the network, the system tracks their movement to deliver a temporally and spatially fine-grained (i.e., a highly granular) view of which devices are present in each cell. User data is grouped per cell for analytics aggregations.

At S506, the monitoring system 500 may also receive eNodeB and ECI-identified metrics 504. In a 4G network, the eNodeB and ECI-identified metrics 504 may include information from an S1-U interface. In a 5G network, the eNodeB and ECI-identified metrics 504 may include information from an N2 interface. The eNodeB and ECI-identified metrics 504 may include, for example, statistics and measurements regarding data sessions transported by a cell, but embodiments are not limited thereto.

At S506, the monitoring system 500 filters and analyzes the combination of the user tracking information 502 and the eNodeB and ECI-identified metrics 504. The analysis may include detecting anomalies. In an embodiment, the data flow 200 of FIG. 2 is implemented as part of S506.

The filtering and analysis may be performed on a per-cell basis. The filtering and analysis may be performed in real-time, that is, with a minimal delay after collection of the information that is being filtered and analyzed. In embodiments, the minimal delay may be, for example, 1, 2, 5 or 15 seconds, but embodiments are not limited thereto.

At S508, the monitoring system 500 may export the filtered data and/or the results of analyzing the filtered data to an external system, and may also provide an indication of a detected anomaly to the external system.

At S510, the monitoring system 500 may export the filtered data and/or the results of analyzing the filtered data for display to an operator on a dashboard. and may also provide an indication of a detected anomaly to be signaled to the operator through the dashboard.

In an embodiment, the monitoring system 500 aggregates statistics for all monitored eNodeBs and cells (ECIs) on regular intervals (e.g., every 15 minutes). The intervals may be configured according to implementation. This provides a top-level view of the network and also allows for data filtering to be applied for any cell.

The aggregated statistics may include (but not limited to) video performance metrics, average user throughput, average active users, cell congestion ratio, traffic composition, or combinations thereof. Analytics may be stored in a big data database cluster (such as, for example, an ElasticSearch database) for fast access and custom metric aggregations.

Figure 6:
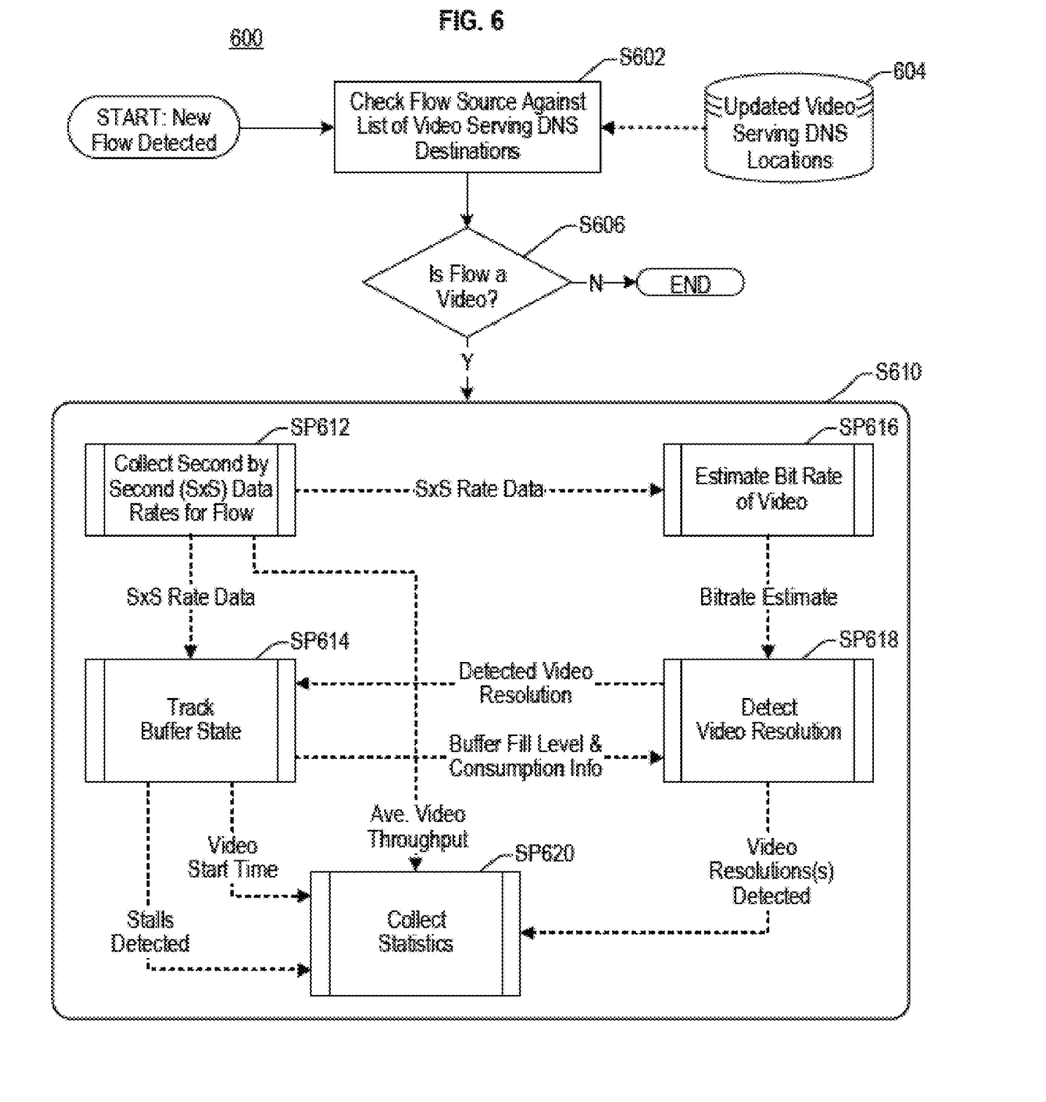
FIG. 6 illustrates a process for monitoring data flows including video, according to an embodiment.

While monitoring traffic from the core of the monitored network, the monitoring system 500 may detect video for known domains (e.g., YouTube, Netflix) and use Machine Learning pattern recognition to estimate video player buffer fill levels to detect start time, stall, and resolution change indicators, as shown in FIG. 6.

FIG. 6 illustrates a process 600 for monitoring data flows including video, according to an embodiment. The process 600 may be performed as part of the monitoring system 500.

In an embodiment, the process 600 utilizes real-time analytics collected about network traffic in order to detect which network interactions are video streams and report out on the average video throughput, average video start time, and average resolution of the video, and to detect stalls in video playback. By detecting the DNS destination of network interactions, the process 600 may use machine learning to keep an up to date list of the most common video serving destinations. This may be used to help identify which interactions in the network are video streams as soon as they start transferring data.

In response to a new flow (i.e., a new data session) being detected, at S602 the process 600 may check the source of the data for the data session against a list of video serving sources. For example, the process 600 may compare an IP address of a packet in the data flow with an IP address obtained from a periodically- or continuously-updated database 604 of Domain Name System (DNS) records of servers that serve videos. The process 600 then proceeds to S606.

At S606, the process 600 determines whether the flow is a video flow. For example, the process 600 may determine that the flow is a video flow when the IP address of the source of the flow matches the IP address of a video source obtained from database 604.

The process 600 may also determine that the flow is a video flow when a pattern of the statistics for the flow matches a pattern for video flows learned through machine learning, which may be determined in an embodiment using a trained neural network. In an embodiment, when the process 600 determines that a flow is a video flow using machine learning, the process 600 may update the database 606 it indicate that an IP address of the source of the flow is an IP address of a video source.

When the flow is determined to be a video flow, at S606 the process 600 proceeds to S610; otherwise, the process 600 exits.

At S610, the process 600 initiates a plurality of subprocesses which execute until the flow is terminated. The plurality of subprocesses include a data collection subprocess SP612, a buffer tracking subprocess SP614, a bit rate estimating subprocess SP616, a video resolution detection subprocess SP618, and a statistics collection subprocess SP620.

The data collection subprocess SP612 may collect second by second data transfer rates (S×S Rate Data) for the flow, and proved the S×S Rate Data to the buffer tracking subprocess SP614 and the bit rate estimating subprocess SP616. The data collection subprocess SP612 may also determine an average video throughput for the flow and provide the average video throughput to the statistics collection subprocess SP620.

The buffer tracking subprocess SP614 may track, on a second by second basis, an input position of a buffer relative to a playback position of the buffer using the S×S Rate Data and a detected video resolution provided by the video resolution detection subprocess SP618. For example, when the S×S Rate Data indicates a data rate greater than a bitrate associated with the detected video resolution, the buffer tracking subprocess SP614 may determine that the playback position of the buffer has become farther away from the input position of the buffer, and when the S×S Rate Data indicates a data rate less than a bitrate associated with the detected video resolution, the buffer tracking subprocess SP614 may determine that the playback position of the buffer has become closer to the input position of the buffer.

The buffer tracking subprocess SP614 may use the buffer position relative to the playback position to determine additional information such as determining stalls by tracking whether the buffer ever runs out of data to stream; for example, when the playback position of the buffer is the same as the input position of the buffer. The buffer tracking subprocess SP614 may provide indications that a stall has been detected to the statistics collection subprocess SP620.

The buffer tracking subprocess SP614 may also determine an average start time of the video (that is, a time between a first time at which first data of the video is received by the buffer and a second time at which the first data is played back from the buffer). The average start time may be calculated based on the S×S Rate Data and an encoding rate corresponding to the detected video resolution. For example, in an embodiment, the buffer tracking subprocess SP614 may be provided with a prebuffer interval in seconds corresponding to an amount of video that will be buffered before playback starts, may determine an amount of data (in bits) by multiplying the prebuffer interval by the encoding rate corresponding to the detected video resolution, and may determine an average start time by dividing the amount of data by the S×S Rate Data or an average thereof. The buffer tracking subprocess SP614 may provide the determined average start time to the statistics collection subprocess SP620.

Utilizing the S×S Rate Data, the bit rate estimating subprocess SP616 may estimate the bitrate seen by the video player and provide the bitrate estimate to the video resolution detection subprocess SP618. In an embodiment, the bitrate estimate is an encoding rate estimate. The bitrate estimate may be determined by observing properties of the data session or inferred from the data transfer rates of the data session. The bitrate estimate may change according to changes in the S×S Rate Data over time.

The video resolution detection subprocess SP618 may detect a video resolution based on the bitrate estimate and on buffer fill level and buffer data consumption information provided by the buffer tracking subprocess SP614. The video resolution detection subprocess SP618 may use a database of standard resolution to bitrate correspondences to determine the video resolution. For example, when the bitrate estimate is 1.3 megabits per second, the video resolution detection subprocess SP618 may infer that the video resolution is 480p, and when the bitrate estimate is 5 megabits per second, the video resolution detection subprocess SP618 may infer that the video resolution is 1080p. The detected video resolution may change in response to changes in the bitrate estimate over time.

The video resolution detection subprocess SP618 may provide the detected video resolution(s) to the buffer tracking subprocess SP614 and statistics collection subprocess SP620.

The statistics collection subprocess SP620 may collect the information provided to it, process the collected information, and provide the processed information to an external system or to a dashboard.

Although step S610 of process 600 is described as a plurality of cooperating subprocesses executing in parallel, embodiments are not limited thereto. For example, in another embodiment, the subprocesses of S610 could instead be respective steps executed sequentially in a single process.

Figure 7:
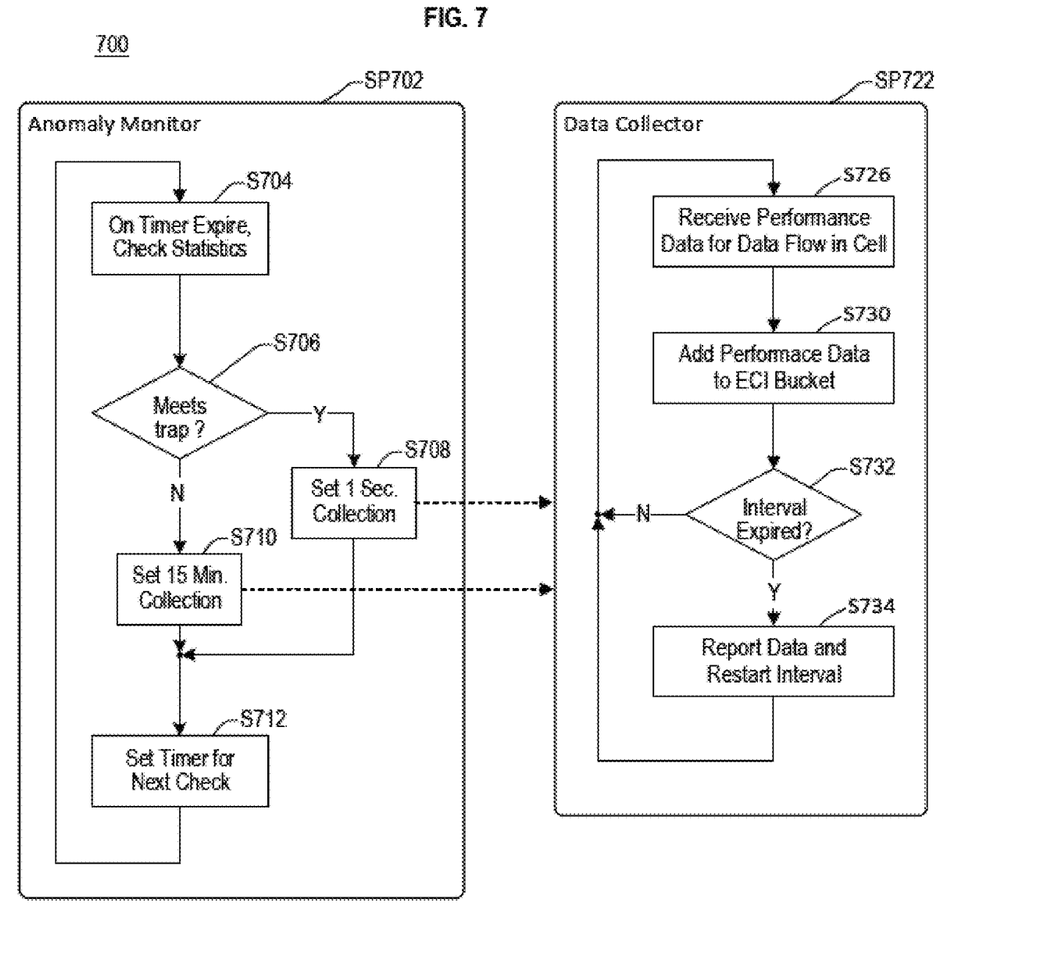
FIG. 7 illustrates processes for monitoring a network, according to an embodiment.

FIG. 7 illustrates a process 700 for monitoring a network, according to an embodiment. The process 700 includes an anomaly monitor subprocesses 702 and a collector subprocess 722. The subprocesses 702 and 722 provide for automatic selection of specific cells for enhanced monitoring.

The process 700 may be performed for each of a plurality of cells in a network. Unlike monitoring process of the related arts, the process 700 monitors real-time aggregate analytics per cell, which may include real-time data such as may be produced by the data flow 200 of FIG. 2 or the monitoring system 500 of FIG. 5. The process 700 may be performed in the 4G network 300 of FIG. 3 by the network monitoring agent 334. The process 700 may be performed in the 5G network 500 of FIG. 4 by the network monitoring and analytics function 428.

In an embodiment, the process 700 monitors the plurality of cells for anomalies on a configurable anomaly detection interval having a low granularity (such as 15 minutes) so that all the cells may be monitored without having to store too much data. Upon detecting a possible anomaly on a cell, the process 700 may change a reporting interval for the cell from a normal interval (such as 15 minutes) to an enhanced interval (such as one second).

For example, the process 700 may monitor for eNodeBs or cells that trigger pre-determined criteria, such as "average user throughput less than 3 Mbps." For these cells, the system may collect enhanced granularity (e.g., per second) metrics. The enhanced granularity metrics may be collected for a configurable duration for as long as the condition continues to trigger. The process 700 may self-regulate monitoring against disk space availability.

The anomaly monitor subprocesses SP702 determines, using measured conditions of a corresponding cell (such as the real-time information that may be produced by the data flow 200 of FIG. 2 and/or the video flow related information collected by the process 600 of FIG. 6) whether data reporting for a cell is performed at the normal interval or the enhanced interval.

At S704, the anomaly monitor subprocesses SP702 waits for the expiration of an anomaly detection timer. In response to expiration of the anomaly detection timer, the anomaly monitor subprocesses SP702 proceeds to S706.

At S706, the anomaly monitor subprocesses SP702 determines whether the measured conditions of the cell meets the conditions for any one of one or more traps. A trap may be, for example, whether an average user throughput is less than a throughput target, whether an average percentage of delivered video flows that are High Definition (HD) video is less than an HD video delivery target, whether a number of active users in the cell is outside a normal active users range, whether a percentage of video flows in the cell is outside a preferred videos percentage range, whether an average resolution of video flows in the cell is outside a range, whether a buffer stall rate for buffered data flows is outside a range, whether load times for a web service (e.g., a specific social media site, shopping site, streaming video site, etcetera) is slower than a respective load time target, whether any other any measured cell condition is outside a respective normal range, or combinations thereof. The ranges used for trap detection may be predetermined, or may be determined according to a property of the cell (such as a bandwidth of the cell or learned historical norms for the cell).

When the measured conditions of the cell meets the conditions for a trap, at S706 the anomaly monitor subprocesses SP702 proceeds to S708; otherwise the anomaly monitor subprocesses SP702 proceeds to S710.

At S708, the anomaly monitor subprocesses SP702 sets the reporting interval for the collection subprocess SP722 to the enhanced interval (here, one second). The anomaly monitor subprocesses SP702 then proceeds to S712.

At S710, the anomaly monitor subprocesses SP702 sets the reporting interval for the collection subprocess SP722 to the normal interval (here, 15 minutes). The anomaly monitor subprocesses SP702 then proceeds to S712.

At S712, the anomaly monitor subprocesses SP702 sets the anomaly detection timer to expire after the anomaly detection interval and proceeds to S704.

The collection subprocess SP722 reports data on a cell using either a reporting interval that may be set, by the anomaly monitor subprocesses SP702, to normal interval or an enhanced interval.

At S726, the collection subprocess SP722 receives performance data regarding a data flow associated with the cell the collection subprocess SP722 is monitoring. The data flow may be a data flow delivering data to a UE in the cell. The performance data may be data produced from the data flow 200 of FIG. 2 and/or produced by the monitoring system 500 of FIG. 5, but embodiments are not limited thereto.

At S730, the collection subprocess SP722 adds the received performance data to a bucket of data associated with an ECI of the cell.

At S732, the collection subprocess SP722 determines whether the reporting interval has expired. When the reporting interval has expired, at S732 the collection subprocess SP722 proceeds to S734; otherwise the collection subprocess SP722 returns to S726.

At S734, the collection subprocess SP722 reports the data collected since the last time it reported data, may empty the bucket of data associated with the ECI, restarts the reporting interval, and returns to S726.

In the process 700 illustrated in FIG. 7, normal monitoring of a cell is performed by reporting data for the cell every 15 minutes, and enhanced monitoring of the cell is performed by reporting data for the cell every second; however, embodiments are not limited to those intervals. Furthermore, in the illustrative processes illustrated in FIG. 7, two monitoring levels (corresponding to a 15 minute normal interval and a 1 second enhanced interval) are illustrated, but embodiments are not limited thereto. For example, in an embodiment the process 700 may include a plurality of enhanced monitoring levels each corresponding to a respective enhanced interval different from the normal interval, and each triggered by trap conditions respectively associated with the monitoring levels.

Although the process 700 is described as two cooperating subprocesses executing in parallel, embodiments are not limited thereto. For example, in another embodiment, the steps of the subprocesses of process 700 could be merged into a single process performed for each monitored cell.

Figure 8:
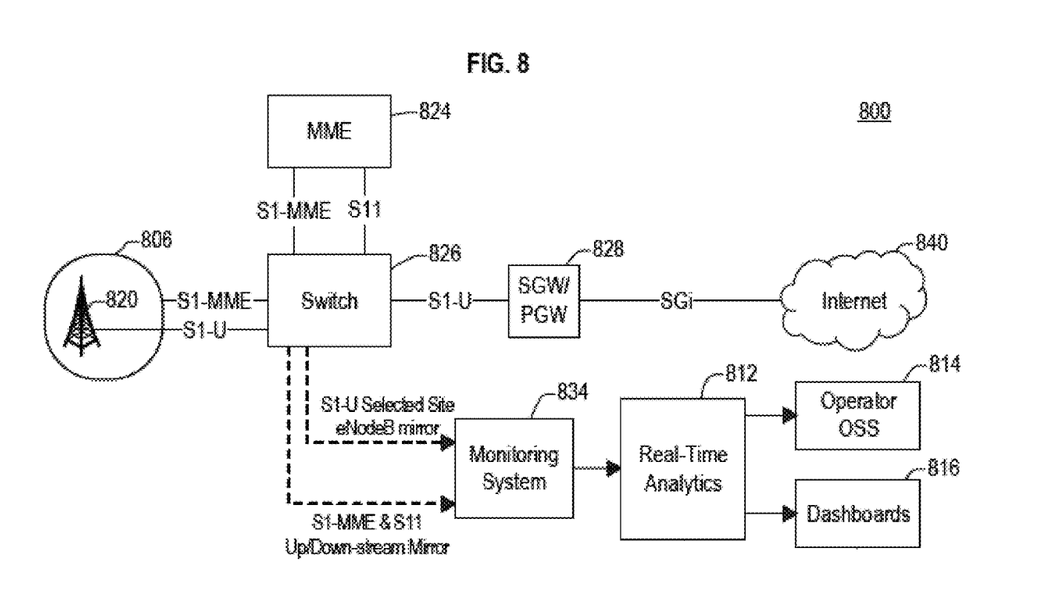
FIG. 8 illustrates a communication network according to an embodiment.

FIG. 8 illustrates a communication network 800 according to an embodiment.

The communication network 800 includes a RAN 806 including an eNodeB 820, a switch 826, an MME 824, and an SGW/PGW 828. The RAN 806, eNodeB 820, switch 826, MME 824, and SGW/PGW 828 respectively correspond to the RAN 306, eNodeB 320A, switch 326, MME 324, and SGW/PGW 328 of FIG. 3, and descriptions of the RAN 806, eNodeB 820, switch 826, MME 824, and SGW/PGW 828 are therefore omitted in the interest of brevity.

The communication network 800 further includes a monitoring system 834 and a real-time analytics system 812. The monitoring system 834 and real-time analytics system 812 may be deployed using one or more bare-metal commercial off-the-shelf (COTS) servers or as one or more Virtual Network Functions (VNFs) in a virtualized environment.

The monitoring system 834 receives mirror data that mirrors data on standard 3GPP interfaces (here, the S1-U, S1-MME, and S11 interfaces) to track usage and to profile network cells, and based on the mirror data produces real-time data. The real-time data may be used by the real-time analytics system 812 to produce real-time analysis of conditions in the communication network 800, and in particular of conditions in cells of the communication network 800.

The real-time analysis may be provided to an operator Operations Support Systems (OSS) 814 for use in managing the communication network 800. The operator OSS may support operating the communication network 800 as a Self-Configuring and Self-Organizing Network (SON), which may use the real-time analysis provided by the real-time analytics system 812 to perform automatic control and configuration of the communication network 800.

The real-time analysis may be provided to external dashboards 816 to efficiently communicate the current state of cells of the communication network 800 to an operator.

Figure 9:
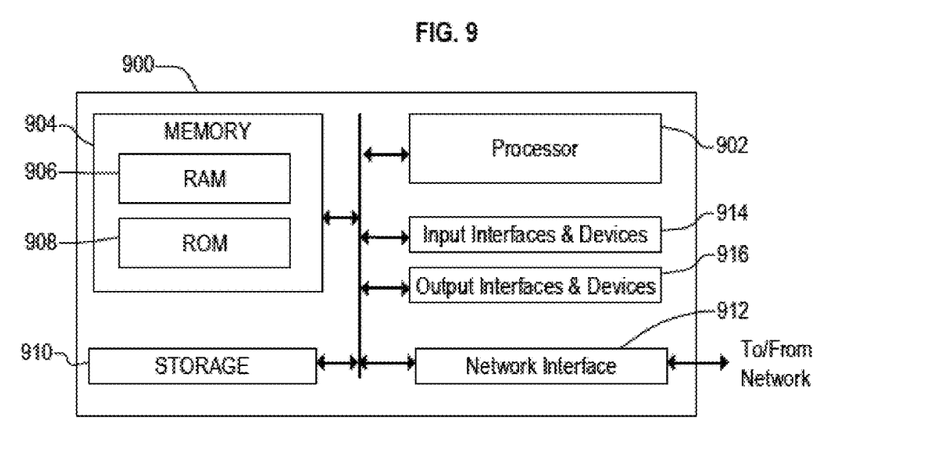
FIG. 9 illustrates a computing system that may be used to implement an embodiment.

FIG. 9 illustrates a computer system 900, which may be used to implement an embodiment. The computer system 900 may implement an embodiment by, for example, executing computer programming instructions stored in a non-transitory computer readable medium.

The computer system 900 may include one or more of a processor 902, a memory 904, input interfaces and devices 914, output interfaces and devices 916, and a storage 910, each of which communicates with each other through a bus, fabric, or other interconnect technology. The computer system 900 may also include one or more network interfaces 912 coupled to a network. For example, when the computer system 900 is used to implement a router or gateway, the computer system 900 may include a network interface 912 for each physical layer network connection of the computer system 900.

The processor 902 may be a central processing unit (CPU) or a semiconductor device that executes processing instructions stored in the memory 904 and/or the storage 910. The memory 904 and the storage 910 may include various forms of volatile or non-volatile storage media. For example, the memory 904 may include a read-only memory (ROM) 908 and a random access memory (RAM) 906, and the storage may include a Hard Disk Drive (HDD), a Solid State Drive (SSD), or the like.

Embodiments may provide respective top level statistics for each cell in a communication network on a short interval (e.g., 15 minutes or less).

Embodiments may provide a system that automatically detects problem cells in a network using data from standard interfaces, with fine-grained spatial and/or topological granularity beyond that available in systems of the related arts. For example, embodiments may detect video performance in a particular cell from data obtained in the middle of the network (such as at a gateway) and detect issues in the cell using that data, but embodiments are not limited thereto.

Embodiments may identify problem cells and provide fine temporal granularity statistics (e.g., per second statistics) for the each cell identified as a problem cell. The fine temporal granularity statistics may include average user throughput, average active users, average connected users, video performance metrics (start time, stall rate, resolution, etcetera), traffic composition, cell congestion level, or combinations thereof, but embodiments are not limited thereto.

Embodiments may be used to identify trouble spots in the network, study what traffic could be causing the trouble, and perform performance monitoring of newly deployed cells to ensure they are working correctly.

Embodiments may be used to perform spectral load balance analysis to determine which carriers in a sector of an eNodeB (that is, which cells in the sector) may be over- or under-utilized. A sector may be spectrally load balanced when each cell in the sector is operating at a similar percentage of its capacity. The spectral load balance analysis may be used to and balance the load in the sector across the supported carriers in the sector, or to identify a carrier that is underused and that may be deprecated (for example, by steering traffic to other cells in the sector) in order to free the bandwidth of that cell for other uses.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method for monitoring a network, the method comprising:
   producing respective User Equipment (UE) location information for a plurality of UEs by tracking each of the plurality of UEs on each of a plurality of cells of the network;
   producing a plurality of data session analytics including respective UE data session performance information for respective data sessions of the plurality of UEs, the UE data session performance information including a throughput, a size, a latency, or a combination thereof for the corresponding data session;
   producing, using the UE location information and the plurality of data session analytics, a plurality of tagged data session analytics by associating each of the data session analytics with an identifier of a network location corresponding to a UE associated with that data session analytics; and
   producing, using the plurality of tagged data session analytics, real-time network metrics, the real-time network metrics including respective real-time performance information for the plurality of cells.

2. The method of claim 1, wherein the real-time network metrics include network topology information including per-cell data session performance information for the plurality of cells.

3. The method claim 1, comprising:
   identifying, in real-time using the real-time network metrics, a cell of the plurality of cells having anomalous performance.

4. The method claim 1, comprising:
   determining, using the real-time network metrics, whether a cell in the plurality of cells is experiencing a performance anomaly;
   in response to determining that the cell is experiencing the performance anomaly, reporting performance information about the cell at an enhanced interval; and
   in response to determining that the cell is not experiencing the performance anomaly, reporting performance information about the cell at a normal interval, the normal interval being longer than the enhanced interval.

5. The method of claim 4, comprising:
   periodically, according to an anomaly detection interval, determining whether the cell in the plurality of cells is experiencing the performance anomaly.

6. The method claim 1, comprising:
   determining, using the real-time network metrics, that a data stream in a cell of the plurality of cells is carrying video data;
   determining, using the real-time network metrics, second by second (SxS) rate data for the data stream;
   determining, in real-time using the SxS rate data, video statistics, the video statistics including a bitrate estimate for the video data, a video resolution of the video data, an average video throughput, a buffer fill level corresponding to the video data, an average start time corresponding to the video data, stall information corresponding to the video data, or combinations thereof; and
   reporting the video statistics in real-time.

7. The method claim 6, comprising:
   determining that the data stream is carrying video data according to an address of the data stream and information about addresses of sources of video data.

8. The method claim 6, comprising:
   determining, using machine learning, that the data stream is carrying video data when a pattern in the real-time network metrics corresponding to the data stream corresponds to a pattern for video-carrying data streams.

9. The method of claim 1, wherein the real-time performance information for the plurality of cells includes average user throughput, average active users, average connected users, video performance metrics, traffic composition, cell congestion level, or combinations thereof.

10. A non-transitory computer readable medium (CRM) having computer-executable instructions embodied thereon that when executed by at least one processor cause the processor to perform a method for monitoring a network, the method comprising:
    producing respective User Equipment (UE) location information for a plurality of UEs by tracking each of the plurality of UEs on each of a plurality of cells of the network;
    producing a plurality of data session analytics including respective UE data session performance information for respective data sessions of the plurality of UEs, the UE data session performance information including a throughput, a size, a latency, or a combination thereof for the corresponding data session;
    producing, using the UE location information and the plurality of data session analytics, a plurality of tagged data session analytics by associating each of the data session analytics with an identifier of a network location corresponding to a UE associated with that data session analytics; and
    producing, using the plurality of tagged data session analytics, real-time network metrics, the real-time network metrics including respective real-time performance information for the plurality of cells.

11. The CRM of claim 10, wherein the real-time network metrics include network topology information including per-cell data session performance information for the plurality of cells.

12. The CRM of claim 10, wherein the method comprises:
    identifying, in real-time using the real-time network metrics, a cell of the plurality of cells having anomalous performance.

13. The CRM of claim 10, wherein the method comprises:
    determining, using the real-time network metrics, whether a cell in the plurality of cells is experiencing a performance anomaly;
    in response to determining that the cell is experiencing the performance anomaly, reporting performance information about the cell at an enhanced interval; and
    in response to determining that the cell is not experiencing the performance anomaly, reporting performance information about the cell at a normal interval, the normal interval being longer than the enhanced interval.

14. The CRM of claim 13, wherein the method comprises:
    periodically, according to an anomaly detection interval, determining whether the cell in the plurality of cells is experiencing the performance anomaly.

15. The CRM of claim 10, wherein the real-time performance information for the plurality of cells includes average user throughput, average active users, average connected users, video performance metrics, traffic composition, cell congestion level, or combinations thereof.

16. A non-transitory computer readable medium (CRM) having computer-executable instructions embodied thereon that when executed by at least one processor cause the processor to perform a method for monitoring a network, the method comprising:

producing User Equipment (UE) location information by tracking UEs on each of a plurality of cells of the network; and producing, using the UE location information, real-time network metrics, the real-time network metrics including respective real-time performance information for the plurality of cells;

determining, using the real-time network metrics, that a data stream in a cell of the plurality of cells is carrying video data;

determining, using the real-time network metrics, second by second (S×S) rate data for the data stream;

determining, in real-time using the S×S rate data, video statistics, the video statistics including a bitrate estimate for the video data, a video resolution of the video data, an average video throughput, a buffer fill level corresponding to the video data, an average start time corresponding to the video data, stall information corresponding to the video data, or combinations thereof; and reporting the video statistics in real-time.

17. The CRM of claim 16, wherein the method comprises:

determining that the data stream is carrying video data according to an address of the data stream and information about addresses of sources of video data.

18. The CRM of claim 16, wherein the method comprises:

determining, using machine learning, that the data stream is carrying video data when a pattern in the real-time network metrics corresponding to the data stream corresponds to a pattern for video-carrying data streams.

* * * * *